US007644724B2

(12) United States Patent
Chaffee

(10) Patent No.: US 7,644,724 B2
(45) Date of Patent: *Jan. 12, 2010

(54) VALVE WITH ELECTROMECHANICAL DEVICE FOR ACTUATING THE VALVE

(76) Inventor: Robert Chaffee, 78 Montgomery St., Boston, MA (US) 02116

( * ) Notice: Subject to any disclaimer, the term of this patent is extended or adjusted under 35 U.S.C. 154(b) by 0 days.

This patent is subject to a terminal disclaimer.

(21) Appl. No.: 10/430,040

(22) Filed: May 5, 2003

(65) Prior Publication Data

US 2003/0205273 A1 Nov. 6, 2003
US 2005/0166963 A9 Aug. 4, 2005

Related U.S. Application Data

(63) Continuation-in-part of application No. 09/859,706, filed on May 17, 2001.

(60) Provisional application No. 60/377,798, filed on May 3, 2002, provisional application No. 60/204,836, filed on May 17, 2000, provisional application No. 60/280,040, filed on Mar. 30, 2001.

(51) Int. Cl.
*F16K 15/18* (2006.01)
*F16K 15/20* (2006.01)
*A47C 27/08* (2006.01)

(52) U.S. Cl. .................. 137/223; 137/522; 137/527; 137/596.17; 251/82; 5/706

(58) Field of Classification Search ............... 137/223, 137/522, 523, 527, 596.17, 603, 613; 251/82, 251/83; 417/446; 5/655.3, 706
See application file for complete search history.

(56) References Cited

U.S. PATENT DOCUMENTS

| 2,168,774 | A | * | 8/1939 | Hurlburt ................. 251/83 |
| 2,285,324 | A | | 6/1942 | Bennett |
| 2,459,689 | A | * | 1/1949 | Dickey et. al. ........... 137/522 |
| 2,767,735 | A | * | 10/1956 | Darling ................ 137/527 |
| 3,095,901 | A | * | 7/1963 | Larson et. al. .......... 137/522 |
| 3,112,502 | A | | 12/1963 | E. S. Forsberg |
| 3,459,363 | A | * | 8/1969 | Miller .................. 417/446 |

(Continued)

FOREIGN PATENT DOCUMENTS

JP    58-53965    4/1983

(Continued)

*Primary Examiner*—John Rivell
(74) *Attorney, Agent, or Firm*—Lando & Anastasi, LLP

(57) ABSTRACT

The invention relates to an assembly comprising an electromechanical device and a self-sealing valve, and in particular, to any inflatable device that includes the assembly. In one embodiment, the assembly comprises a valve housing defining an opening through which fluid can be provided to the inflatable device, a flexible diaphragm assembly that is configured to self-seal the opening with sufficient fluid pressure in the inflatable device and to open under sufficient fluid pressure from a fluid moving device, to provide fluid through the opening to and seal the inflatable device. The assembly further comprises an electromechanical device including an actuating arm, having a first position in which the actuating arm urges open the self-sealing valve and a second position in which the actuating arm does not act upon the self-sealing valve, so as to regulate an amount of fluid within the inflatable device. With this arrangement, a small, low power, low duty cycle electromechanical device can be used.

42 Claims, 5 Drawing Sheets

U.S. PATENT DOCUMENTS

| | | | |
|---|---|---|---|
| 3,665,958 A * | 5/1972 | Dunkelis | 137/522 |
| 3,719,401 A * | 3/1973 | Peruglia | 137/522 |
| 4,175,297 A | 11/1979 | Robbins et al. | |
| 4,273,310 A * | 6/1981 | Ginzler | 251/82 |
| 4,862,533 A | 9/1989 | Adams, III | |
| 4,890,344 A | 1/1990 | Walker | |
| 4,911,405 A | 3/1990 | Weissgerber et al. | |
| 4,948,092 A | 8/1990 | Kasper et al. | |
| 4,986,738 A | 1/1991 | Kawasaki et al. | |
| 4,990,060 A | 2/1991 | Cheng-Chung | |
| 5,037,062 A * | 8/1991 | Neuhaus | 251/82 |
| 5,267,363 A | 12/1993 | Chaffee | |
| 5,367,726 A | 11/1994 | Chaffee | |
| 5,494,258 A * | 2/1996 | Weissgerber et al. | 251/82 |
| 5,503,618 A | 4/1996 | Rey | |
| 5,606,756 A | 3/1997 | Price | |
| 5,904,172 A | 5/1999 | Gifft et al. | |
| 6,129,524 A | 10/2000 | Woollenweber et al. | |
| 6,206,654 B1 | 3/2001 | Cassidy | |
| 6,237,621 B1 | 5/2001 | Chaffee | |
| 6,237,653 B1 | 5/2001 | Chaffee | |
| 6,302,145 B1 | 10/2001 | Ellis et al. | |
| 6,332,760 B1 | 12/2001 | Chung | |
| 6,439,264 B1 | 8/2002 | Ellis et al. | |
| 6,530,751 B1 | 3/2003 | Song et al. | |
| 6,543,073 B2 | 4/2003 | Wu | |
| 6,679,686 B2 | 1/2004 | Wang | |
| 6,793,469 B2 | 9/2004 | Chung | |
| 6,836,914 B1 * | 1/2005 | Tsai | 5/655.3 |
| 6,955,527 B2 * | 10/2005 | Yen | 5/706 |
| 7,039,972 B2 * | 5/2006 | Chaffee | 5/706 |
| 7,475,440 B2 * | 1/2009 | Chaffee | 5/655.3 |
| 2001/0026763 A1 | 10/2001 | Chung | |
| 2002/0194678 A1 | 12/2002 | Chung | |
| 2003/0003001 A1 * | 1/2003 | Chaffee | 417/423.1 |
| 2003/0024050 A1 * | 2/2003 | Boso et al. | 5/706 |
| 2003/0099560 A1 | 5/2003 | Wang | |
| 2003/0215340 A1 | 11/2003 | Chung | |
| 2004/0037717 A1 | 2/2004 | Wang | |
| 2005/0118046 A1 | 6/2005 | Wang | |
| 2005/0186097 A1 | 8/2005 | Wang | |

FOREIGN PATENT DOCUMENTS

| | | | |
|---|---|---|---|
| JP | 61-126241 | | 6/1986 |
| JP | 07-14273 | | 3/1995 |
| WO | WO 98/03810 | * | 1/1998 |
| WO | WO 00/40882 | * | 7/2000 |
| WO | WO 01/87121 | | 11/2001 |
| WO | WO 03/093709 | | 1/2003 |

* cited by examiner

VALVE WITH ELECTROMECHANICAL DEVICE FOR ACTUATING THE VALVE

RELATED APPLICATIONS

This application claims priority under 35 U.S.C. § 119(e) to U.S. Provisional Application Ser. No. 60/377,798, entitled "VALVE WITH ELECTROMECHANICAL DEVICE FOR INFLATABLE DEVICE," filed on May 3, 2002, which is herein incorporated by reference in its entirety. This application also claims priority under 35 U.S.C. §120 as a continuation-in-part (CIP) to U.S. application Ser. No. 09/859,706 entitled "INFLATABLE DEVICE WITH RECESSED FLUID CONTROLLER AND MODIFIED ADJUST DEVICE," filed May 17, 2001, which claims priority under 35 U.S.C. § 119(e) to U.S. Application No. 60/204,836, filed May 17, 2000 and to U.S. Application No. 60/280,040, filed Mar. 30, 2001.

FIELD OF INVENTION

This invention relates to a valve comprising an electromechanical device and, in particular, to a self-sealing valve used with an electromechanical device to bias open the valve to regulate an amount of fluid in an inflatable device.

BACKGROUND OF INVENTION

Inflatable devices are used in a variety of contexts where buoyancy or a cushioned support is needed, where space is limited, or portability is desired. For example, inflatable mattresses, cushions and other body Supports are used for applications such as camping, hospital bedding, and both occasional and everyday bedding in the home. Such inflatable devices have the additional advantage that the degree of inflation of the support can be adjusted to provide even support of an irregular object, such as a person. Other examples of inflatable devices include boats, rafts and other devices for use in the water where use of an inflatable device may benefit support, health, comfort, and safety.

Inflatable devices typically include valves for inflation and deflation of the devices. Valves used with inflatable devices may include self-sealing valves such as those described in U.S. Pat. No. 6,237,621, which is hereby incorporated by reference in its entirety. Inflatable devices may also include mechanisms, such as manually or electrically powered pumps, to aid in inflating and/or deflating the devices.

SUMMARY OF INVENTION

One embodiment of the invention comprises a valve and electromechanical device assembly, comprising a self-sealing valve, a flexible diaphragm assembly and an electromechanical device. The self-sealing valve comprises a housing having a wall defining an opening through which a fluid is provided and also defining a valve seat. The flexible diaphragm assembly positions the flexible diaphragm adjacent the opening and the valve seat, is configured to move at least a portion of the flexible diaphragm at least partially away from the valve seat under bias of a fluid provided on a first side of the flexible diaphragm assembly and is configured to close and maintain a self-seal against the valve seat under bias of a fluid on a second side of the flexible diaphragm assembly. The electromechanical device comprises an actuator arm having a first position in which the actuator arm acts on the flexible diaphragm assembly to urge the at least the portion of the flexible diaphragm at least partially away from the valve seat so as to open the self-sealing valve, and having a second position in which the actuator arm does not act upon the flexible diaphragm assembly.

With this arrangement, a small, low power, low duty cycle electromechanical device can be used. In addition, a plurality of electromechanical devices including, for example, solenoids and motors can be used in combination with at least one self-sealing valve. Furthermore, the valve and electromechanical device can flexibly be used to provide a plurality of adjustment functions, such as, providing minor inflation/deflation adjustments for comfort control of an inflatable device, as well as substantial inflation or deflation of the inflatable device.

Another embodiment of the invention comprises a method of regulating an amount of fluid within an inflatable device comprising a self-sealing valve and an electromechanical assembly. The method comprises biasing open the self-sealing with sufficient fluid pressure provided from a fluid moving device, so as to provide the fluid through the opening and the self-sealing valve to the inflatable device. The method also comprises biasing the self-sealing valve to a closed position with sufficient pressure from fluid within the inflatable device and in the absence of fluid from the fluid moving device. The method further comprises biasing, with the electromechanical device, the self-sealing valve to at least a partially opened position so as to regulate an amount of fluid within the inflatable device.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
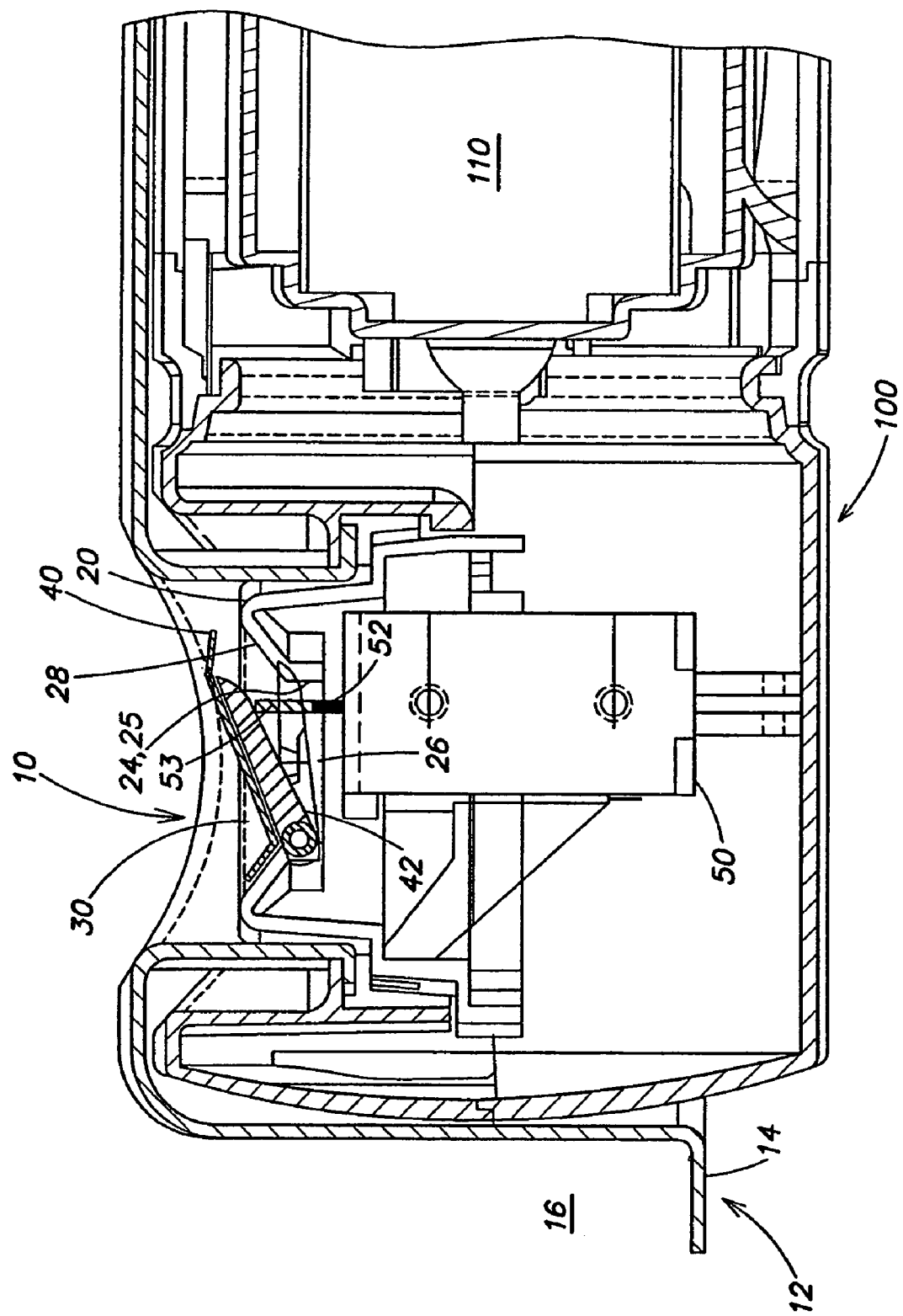
FIG. 1 is a cross-sectional view of one embodiment of a fluid moving device comprising a valve and an electromechanical device of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As used herein, "inflatable" is to be understood as able to be inflated by any fluid such as, for example, a gas, air, a liquid, and the like. As used herein, an "inflatable device"

comprises at least one fluid impermeable bladder that can be inflated and sealed, and may comprise many shapes, sizes, constructions, and materials.

The invention relates to a self-sealing valve that can be used in conjunction with an electromechanical device to bias open the valve. In particular, in one embodiment, the invention relates to a self-sealing valve that can open under the pressure of a fluid moving device to inflate an inflatable device, and that can close under pressure from fluid within the inflatable device, without any assistance from an electromechanical device. In this embodiment, the electromechanical device is used to bias open the valve to at least partially deflate the inflatable device, for example, to adjust an amount of fluid within the inflatable device, and also to substantially deflate the inflatable device. For example, the self-sealing valve can be opened by the electromechanical device for a short duration to adjust the amount of fluid in the inflatable device, and can be biased open to substantially deflate the inflatable device. In another embodiment, the invention comprises an electromechanical device coupled to a self-sealing valve, wherein the electromechanical device comprises an actuator arm that is not connected to the valve, but instead can be biased into contact with the self-sealing valve to bias open the self-sealing valve. In this embodiment, in the closed position, or any position other than an open position, the electromechanical device and the actuator arm may not be in contact with the self-sealing valve assembly. Another embodiment of the invention comprises an electromechanical device and two valve assemblies, one for each fluid impermeable bladder of an inflatable device comprising at least two fluid impermeable bladders. In this embodiment, the electromechanical device can be used to biased open one self-sealing valve at a time, to adjust an amount of fluid within the fluid impermeable bladder coupled to the respective self-sealing valve, or to substantially deflate the fluid impermeable bladder. Other embodiments of the invention will be described infra.

As will be disclosed herein, some of the advantages of the various embodiments of the invention include substantially reduced power requirements for the electromechanical actuation device and substantially reduced cycles of operation for the electromechanical actuation device, compared with conventional valve and solenoid combinations. Another advantage is that a plurality of electromechanical devices including, for example, solenoids and motors can be used in combination with at least one self-sealing valve. Still another advantage is that the valve and electromechanical device of the invention can flexibly be used to provide a plurality of adjustment functions, such as, providing minor inflation/deflation adjustments for comfort control of an inflatable device, as well as substantial inflation or deflation of the inflatable device.

In contrast, Solenoids have been used in conjunction with valves for inflatable devices. In such inflatable devices, the valves typically employ a spring to maintain the valves in a normally biased closed position. A solenoid is typically provided with the valve and is typically sized and arranged to overcome the force of the spring biasing the valve closed so as to open the valve. Such solenoids are typically center mounted with the diaphragm of the valve. In such arrangements, the force of the spring biasing the valve closed has to be greater than a maximum internal air pressure within an inflatable device, so as to maintain the valve in a closed position when the inflatable device is inflated. Accordingly, the solenoid has to be sized and arranged to provide a force greater than the force provided by the spring in order to open the valve. In addition, since the spring normally biases the valve closed, the solenoid typically has to be energized to open the valve both for the purpose of inflating an inflatable device and also for the purpose of exhausting air from the inflatable device. This arrangement results in a long operating cycle of the solenoid to either inflate the inflatable device or deflate the inflatable device, since the solenoid must be energized for the entire time of inflation or deflation. In addition, the solenoid has to be sized so as to provide enough force to overcome the force provided by the spring maintaining the valve in a closed position, and therefore is typically a large, power consuming, and expensive solenoid device. In addition, this arrangement suffers from the infirmity that the amount of fluid that can be provided to the inflatable device and exhausted from the inflatable device are typically the same, since the valve can typically only be opened to a single position or closed by the solenoid. Further, the solenoid typically restricts the fluid pathway, thus requiring a substantial inflation or deflation time for the inflatable device. For example, Select Comfort makes an inflatable mattress with this typical arrangement that takes on the order of about 10 minutes to inflate. Thus, this arrangement suffers from the infirmity of not being able to control an amount of fluid within the inflatable device in sufficient time frames. In particular, the time to fine tune the level of inflation of an inflatable device by this arrangement is typically too long.

It is to be appreciated that the valve and electromechanical device combination of the invention can be used as an alternative or a replacement to the stand alone valve of an inflatable device. For example, the valve and electromechanical device of the invention can be used within the fluid moving device and valve combination disclosed in U.S. Pat. No. 5,267,363 (hereinafter the "'363 Patent") and U.S. Pat. No. 5,367,726 (hereinafter the "'726"), which are herein expressly incorporated by reference, to inflate and control an amount of fluid within an inflatable mattress. It should also be appreciated that although the valve and electromechanical device combination of the invention is illustrated and can be used to inflate, deflate and control an amount of fluid within generally an inflatable device, the combination can be used with any inflatable device, such as, for example: inflatable furniture, or sporting items such as chairs, mattresses and pillows; inflatable safety devices, such as life preservers, barriers, bumpers, and pads; inflatable medical devices, such as supports, casts, and braces; inflatable luggage devices such as, padding and luggage lining material; inflatable recreational devices, such as swimming aids, floats, tubes, and rings; inflated vehicles and vehicle components, such as boats, rafts, and tires; inflatable support structures, such as buildings, portable enclosures, platforms, ramps, and the like; inflatable body support devices, such as seats, back supports, body pillows, and the like.

It should also be appreciated that any of the valve and electromechanical device combinations of the invention, as disclosed infra, can be used in conjunction with any fluid moving device, such as that disclosed in U.S. Pat. No. 6,237,653 herein incorporated by reference; that disclosed in pending U.S. patent application Ser. No. 09/859,706, herein incorporated by reference; and that disclosed in pending U.S. patent application Ser. No. 10/113,836 herein incorporated by reference.

It is further to be appreciated that the valve and electromechanical device combination of the invention is typically used over the pressure range anywhere from approximately 0 to 1 pound per square inch (hereinafter "psi"). However, it should also be appreciated that the valve and electromechanical device combination of the invention can be used at any pressure above about 1 psi and at which the valve and electromechanical device still function properly such as, for example, to provide a seal of the inflatable device which can be biased open by the electromechanical device, and that such pressure ranges are within the scope of the invention. It is to be understood that as used herein, a range of approximately 0 to about 1 psi is understood to be a low pressure range, a range of approximately 1 to 2 psi is understood to be a medium pressure range, and a range of approximately 2 to 5 psi is understood to be a relatively high pressure range.

Referring now to FIG. 1, there is illustrated a cross-sectional view of one embodiment of a valve and electromechanical device combination of the invention. In particular, there is illustrated a fluid moving device 100 that can be at least partially within an inflatable device 12 or coupled to the inflatable device 12 having an outer wall 14 that is a fluid impermeable bladder. In particular, the fluid impermeable bladder 14 separates an exterior of the inflatable device from an interior 16 of the inflatable device. In this embodiment, the valve 10 comprises an outer wall 20 and a valve wall 24 defining a circular opening 26 through which a fluid may be transferred to and from the interior 16 of the inflatable device. The circular opening preferably has a diameter of about 1" or greater. However, it should be appreciated that the diameter can also be less than approximately 1", such as, in the range of ½" to ¾" so as to be coupled to a tubing having a diameter in this range. The valve also comprises a tapered wall from the opening 26 of diameter 25 to the outer wall 20 of increased diameter 30, to create a tapered valve seat 28. The self-sealing valve also comprises a diaphragm 40 that is generally circular, deformable, flexible, and for this embodiment has a diameter that is less than the larger diameter region 30, and greater than the smaller diameter 25 of opening 26.

However, it should be appreciated that according to the invention, the diaphragm 40 can be of any shape, material, size and construction so long as it provides a sufficient seal of the inflatable device. In the illustrated embodiment, the valve 10 comprises a self-sealing valve, in which the diaphragm 40, in the closed position, mates with the valve seat 28 to seal the opening 26. In one embodiment, a flexible diaphragm assembly comprises diaphragm 40 which is supported by a diaphragm support 42. In the illustrated embodiment, the diaphragm support 42 is hingedly connected to a wall 24, so that it can be opened and closed about a hinge point connection. However, it should be appreciated that the diaphragm support 42 in combination with the diaphragm 40 of the valve 10, can be any of a plurality of structures that may be self-sealing, such as disclosed in U.S. Pat. No. 6,237,621, herein incorporated by reference. In other words, the flexible diaphragm assembly may be constructed in any manner that allows the diaphragm to open under the influence of fluid provided by the fluid moving device 110, and to close at a suitable fluid pressure within the inflatable device 16, in the absence of fluid from the fluid moving device. It should further be appreciated that the self-sealing valve 10 can comprise many different variations, as known to those of skill in the art such as, for example, a flexible diaphragm without a diaphragm support. Typically, the diaphragm support 42 is constructed from a relatively rigid plastic material, and the diaphragm 40 may be connected to the diaphragm support in any manner that permits the diaphragm 40 to be positioned within the opening 26, and to open from the influence of a fluid provided by the fluid moving device 110 and also from an influence provided by the electromechanical device 50.

Thus, according to one embodiment of the invention, the valve 10 is a self-sealing valve that opens under the influence of a fluid from the fluid moving device 110 to pressurize the inflatable device 16, and that closes to retain fluid within the inflatable device 16 in the absence of such fluid. In this embodiment, the self-seal is accomplished by a fluid pressure within the inflatable device 12 biasing the diaphragm 40 against the valve seat 28.

It is to be appreciated that the electromechanical device 50 may be any device that is capable of biasing the self-sealing valve 10 to an open position. Some examples of electromechanical devices that may be used with the invention include solenoids and electrical motors, such as motors that have at least two positions, which can be arranged to correspond to an open position and a closed position of the self-sealing valve 10. For example, as will be discussed in further detail infra, an electric motor can be used to bias open the self-sealing valve in a first position, and in a second position to allow the self-sealing valve 10 to close. Alternatively, another example is an electric motor comprising a suitable arrangement of gears having at least two positions, that can be adapted with the self-sealing valve to bias open and allow the valve 10 to close.

In the embodiment of FIG. 1, the electromechanical device 50 includes an actuator arm 52, that is biased by the electromechanical device 50 to open the valve 10 (as illustrated) by acting on a portion of the valve. As illustrated in FIG. 1, in one embodiment of the invention, the actuator arm 52 is coupled to, is directly connected to, or is a portion of a moving portion of a solenoid 50, which can be energized to bias the actuator arm to open the valve 10, by biasing the diaphragm 40 away from the valve seat 28. It is to be appreciated that the actuator arm 52 may act on any portion of the valve 10, so as to bias the valve 10 open, such as against the diaphragm 40 or against the diaphragm support 42. It is also to be appreciated that according to this embodiment of the invention, there is a reduced force required to bias open the valve 10. Since the diaphragm support 42 is mounted by a hinge point to the frame 20, the actuator arm 52 can act on a portion of the diaphragm 40 or the diaphragm support 42 opposite the hinge point. In particular, the actuator arm 52 acts on a portion of the diaphragm 40 or the diaphragm support 42 remote from the hinge point of the valve 10 to the wall 24. Accordingly, the combination of the solenoid 50 and the self-sealing valve 10 have the advantage that there is less force needed to actuate the valve to the open position at the portion of the valve remote from the hinge point, than at the hinge point. In particular, the further away from the hinge point that the actuator arm contacts the diaphragm 40 or the valve arm 42, the smaller the force that is needed to bias the valve 10 to an open position with the electromechanical device.

According to one embodiment of the invention, the electromechanical device 50 and the actuator arm 52 are energized to move either of the diaphragm 40 and the support arm 42 away from the valve seat 28, so as to break the seal of the self-sealing valve 10, so as to either regulate or substantially alter an amount of fluid within the inflatable device 12. In particular, a shaded portion 53 of the actuator arm 52 illustrates the valve arm in a first position which is used to substantially bias open the self-sealing valve 10. In addition, a darkened portion of the actuator arm 52 illustrates the valve in a second position, in which it has been allowed to close by the solenoid 50 and the actuator arm 52, such that the actuator arm no longer is biasing the diaphragm 40 or the diaphragm support 42 substantially away from the valve seat. Accordingly, it is to be appreciated that the first position of the actuator arm of the solenoid 50 can be used to substantially open the self-sealing valve, and that the second position of the actuator arm can be used to allow the valve to operate under its normal condition, so as to open under the influence of fluid provided by fluid moving device 110, and so as to close upon sufficient fluid within the inflatable device 12. It is to be appreciated that the first position of the actuator arm can be configured so as to substantially open the valve for a longer duration so as to substantially deflate the inflatable device 12, or it can be configured to substantially open the valve for a short duration so as to regulate an amount of fluid within the inflatable device 12. In other words, to provide for controlled fluid pressure within the inflatable device, for example, to adjust a comfort level of the inflatable device.

Figure 2:
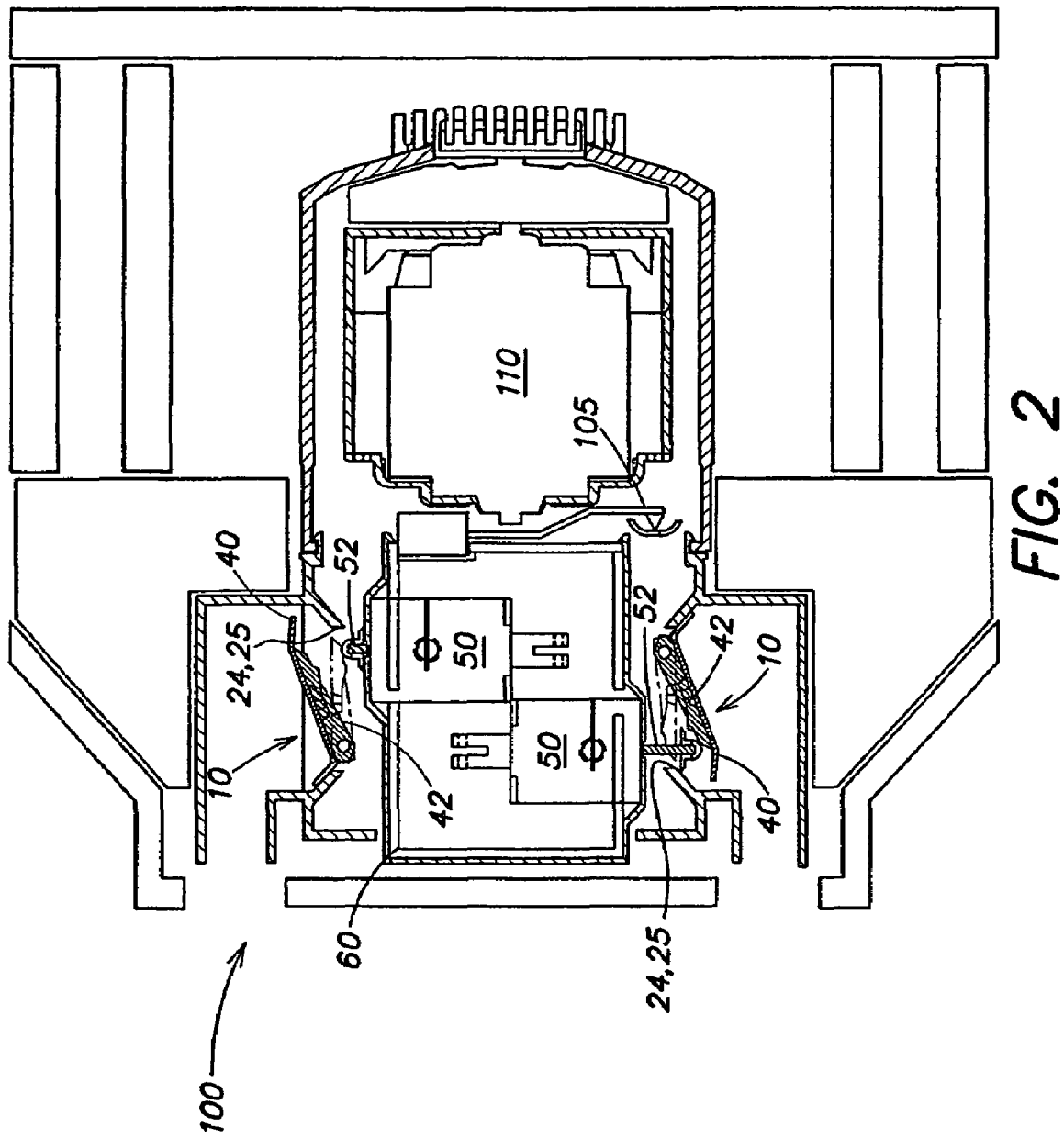
FIG. 2 is a cross-sectional view of another embodiment of a fluid moving device comprising two valves and a plurality of actuating devices of the invention.

Referring to FIG. 2, there is illustrated in cross section another embodiment of a self-sealing valve in combination with an electromechanical device of the invention. It is to be appreciated that like reference numbers in FIG. 2 to FIG. 1, correspond to like parts and that for the sake of brevity the description of each part will not herein be repeated. In the embodiment of FIG. 2, the combination of the self-sealing valve and electromechanical device of the invention are part of a fluid control device 100 that inflates, deflates and regulates an amount of fluid within an inflatable device. The fluid control device 100 includes a pump 110 and multiple self-sealing valves 10, in combination with respective electromechanical devices 50. In the embodiment of FIG. 2, each combination of a self-sealing valve and an electromechanical device operates independently, however it is to be appreciated that a plurality of self-sealing valves may operate in combination with one or more electromechanical devices such as illustrated in FIGS. 3A-3B, and that such combinations may also operate independently or dependently.

As is illustrated in FIG. 2, in one illustrative condition, the lower valve is biased to a substantially opened position by actuator arm 52 and solenoid 50, so as to at least partially exhaust air from a fluid impermeable bladder coupled to the lower valve. In addition, as is illustrated in FIG. 2, in another illustrative condition, the upper valve 10 can be opened under the influence of fluid provided by the pump 110, while the actuator arm is in a position allowing the valve 110 to operate in a normal manner (illustrated as opening up under the influence of fluid from the fluid moving device 110), so as to inflate the fluid impermeable bladder coupled to the upper valve. It is to be appreciated that in the illustrated condition of the upper valve, operating in a normal manner (not under influence from the electromechanical device) that the valve 110 can also close to self-seal the fluid impermeable bladder, in the absence of fluid form the fluid moving device, and with sufficient fluid in the impermeable bladder. It is also to be appreciated that either self-sealing valve and electromechanical device combinations can operate in either manner, and that the conditions of the valves illustrated in FIG. 2 are for illustration purposes only. With this arrangement, the fluid control device 100 is used to inflate, deflate, and adjust an amount of fluid within two fluid impermeable bladders, each coupled to a respective one of the upper and lower self-sealing valves. Accordingly, the embodiment of the invention as illustrated in FIG. 2 is useful for inflatable devices with at least 2 bladders such as, for example, a double inflatable mattress with separate comfort zones for two different users, each zone having a separate bladder.

The embodiment of FIG. 2 may also comprise a third electromechanical device 60, which biases a control arm 105 to one of two positions to either allow air to be provided to or exhausted from a fluid impermeable bladder coupled to the upper valve, or the fluid impermeable bladder coupled to the lower valve. In particular, third electromechanical device 60 biases rotating arm 105 so as to seal off one of the self-sealing valves from the fluid moving device, so that fluid can only be provided to or exhausted from one fluid impermeable bladder at a time. For example, the upper fluid impermeable bladder may be filled with fluid from the fluid moving device 110, wherein the self-sealing valve opens up under pressure of fluid provided by the fluid moving device 110. With this condition, the rotating arm 105 is rotated under influence from the electromechanical device to a position to seal of the lower self-sealing valve from the fluid moving device, such that fluid is prevented from being provided to the fluid impermeable bladder coupled to the lower self-sealing valve. It is to be appreciated that with this arrangement, the rotating arm can also be rotated to a second position to seal off the upper self-sealing valve from the fluid moving device, such that fluid is prevented from being provided to the fluid impermeable bladder coupled to the upper self-sealing valve. In the second position of the rotating arm, fluid can be exhausted from or provided to the impermeable bladder coupled to the lower self-sealing valve. In other words, in one embodiment of the fluid controller device 100 of FIG. 2, only one of the two fluid impermeable bladders may be inflated or exhausted at any one time. It is thus to be appreciated that with the arrangement of FIG. 2, one fluid impermeable bladder can not be inflated at the same time that the second bladder is to be deflated.

Figure 3A:
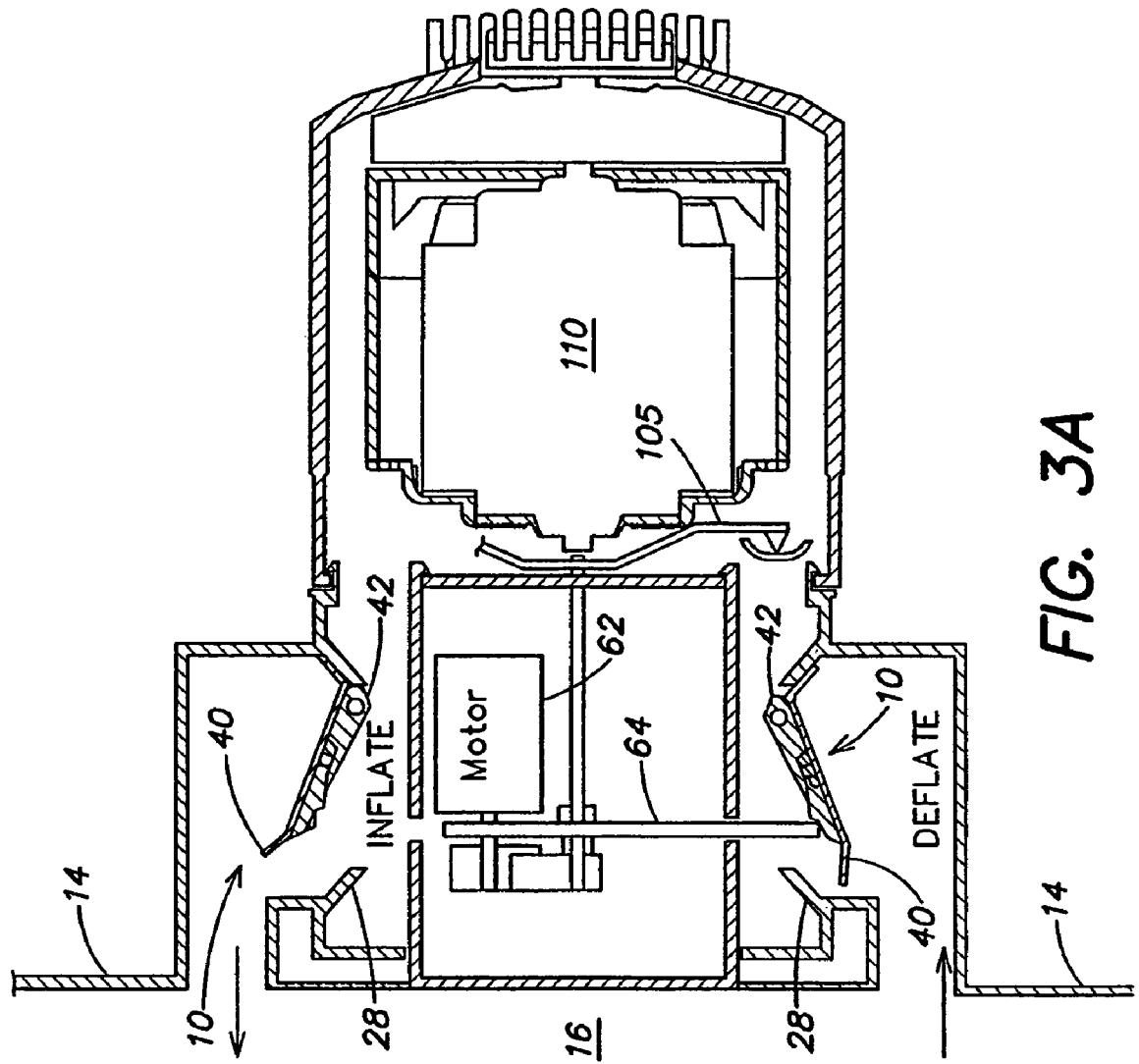
FIG. 3A is a cross-sectional view of another embodiment of the invention, comprising a fluid moving device, two valves and an actuator device in a first condition.
Figure 3B:
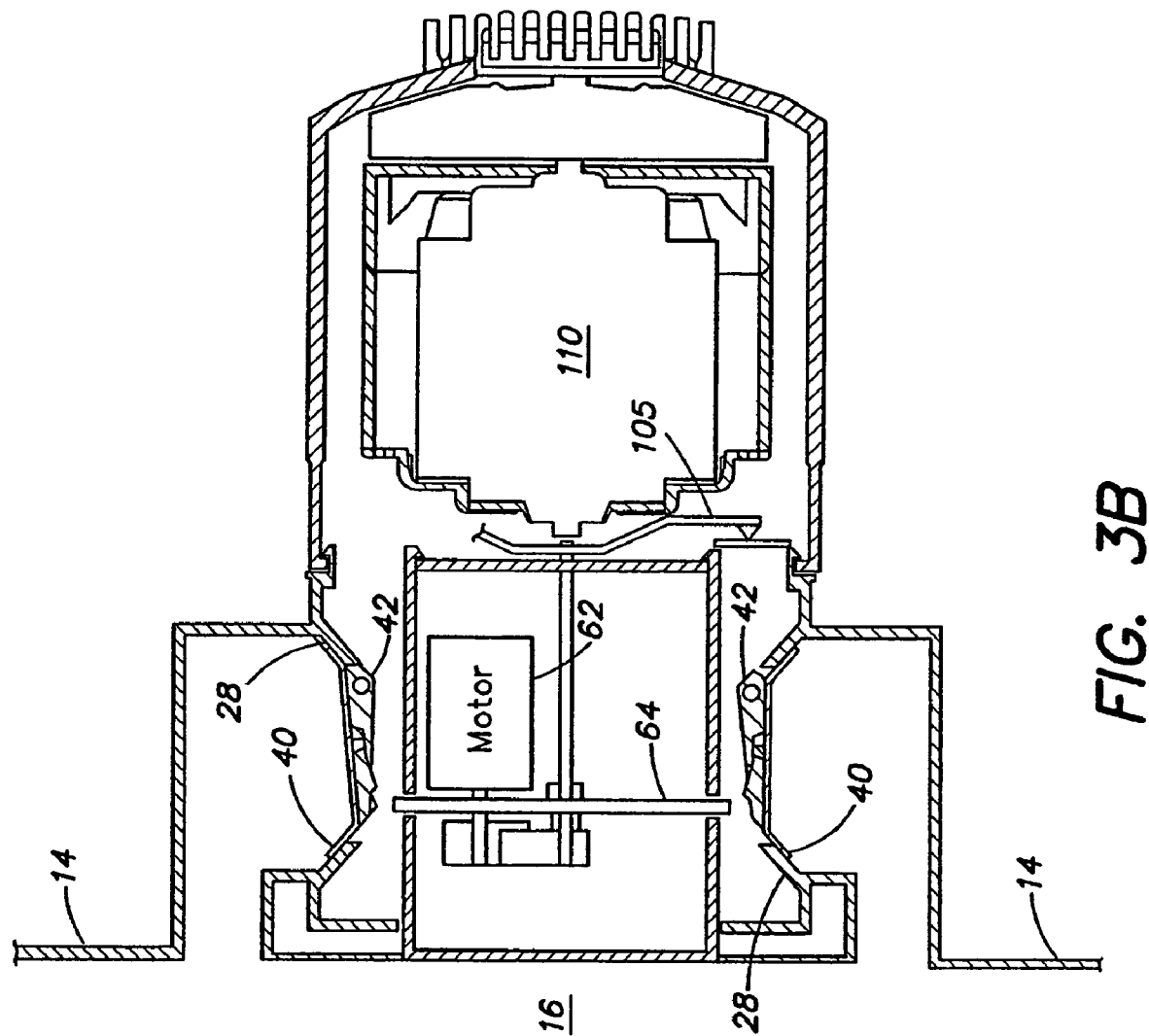
FIG. 3B illustrates the embodiment of the invention of FIG. 3A in a second condition.

Referring now to FIG. 3A and FIG. 3B, there is illustrated in cross section another embodiment of the invention having at least two different operating positions. In particular, although the electromechanical device of the invention can comprise a solenoid as discussed above, it may also comprise a motor 62 that can be used to bias the actuator arm 64. It is to be appreciated that like reference numbers in FIG. 3A and FIG. 3B to that of FIGS. 1 and 2, represent like parts, and the description of each part is not necessarily repeated for the sake of brevity. In the embodiment of FIG. 3A and FIG. 3B, the motor and actuator arm have at least two positions that can each be used to operate on a respective self-sealing valve 10. In particular, as is illustrated in FIG. 3A, in a first position the motor biases the actuator arm 64 so as to substantially move the flexible diaphragm of the lower self-sealing valve away from the valve seat 28 so as to substantially open the fluid pathway, to at least partially exhaust air from an inflatable bladder coupled to the lower self-sealing valve. In addition, the motor can move the actuator arm to a second position so as to allow the lower valve to operate under normal self-sealing conditions, such as to self seal with sufficient fluid within the fluid impermeable bladder coupled to the lower self-sealing valve, and so as to open under sufficient pressure of fluid provided by the fluid moving device 110. In one embodiment, in the second position of the motor 62, the actuator arm is configured to bias the upper valve to a substantially open position (with the flexible diaphragm at least partially moved away from the valve seat 28), so as to at least partially exhaust air from an inflatable bladder coupled to the upper self-sealing valve. Alternatively, in another embodiment of the invention, the second position of the motor and actuator arm may be a position in which neither self-sealing valve is biased open by the actuator arm, as is illustrated in FIG. 3B. In this embodiment, the motor may also comprise a third position, in which the motor can bias the actuator arm to a position so as to substantially open the upper self-sealing valve, so as to at least partially exhaust air from a fluid impermeable bladder coupled to the upper self-sealing valve.

In one embodiment, the motor can also be used to rotate a rotating arm 105 so as to seal off one of the self-sealing valves from the fluid moving device, so that fluid can only be provided to one fluidly impermeable bladder at a time. For example, as illustrated in FIG. 3A, the upper fluid impermeable bladder may be filled by fluid from the fluid moving device 110, wherein the self-sealing valve opens up under pressure of fluid provided by the fluid moving device 110. For this position, the rotating arm 105 is rotated under influence from the motor to a position to seal off the lower self-sealing valve from the fluid moving device, such that fluid is prevented from being provided to the fluid impermeable bladder coupled to the lower self-sealing valve. It is to be appreciated that with this arrangement, the rotating arm can also be rotated to a second position to seal off the upper self-sealing valve from the fluid moving device, such that fluid is prevented from being provided to the fluid impermeable bladder coupled to the upper self-sealing valve. In this second position of the rotating arm, fluid can be exhausted from or provided to the fluid impermeable bladder coupled to the lower self-sealing valve.

With any of the embodiments discussed above, a method of inflating and deflating at least one fluid impermeable bladder and regulating an amount of fluid within the at least one fluid impermeable is provided by the invention. In particular, in one embodiment, the self-sealing valve can be biased open under the influence of fluid provided by the fluid moving device so as to inflate the inflatable device. Upon sufficient fluid pressure within the inflatable device, the self-sealing valve is biased to the closed position by the fluid pressure within the inflatable device. An electromechanical device is used to regulate an amount of fluid within the inflatable device or to substantially deflate an amount of fluid within the inflatable device. In addition, for embodiments of inflatable devices comprising at least two bladders, the above acts can be supplemented by providing fluid through a second electromechanical device and self-sealing valve to a second fluid impermeable bladder, and the second electromechanical device and self-sealing valve can be used so as to either regulate an amount of fluid within the inflatable device or to substantially alter the amount of fluid from within the second fluid impermeable bladder.

Figure 4A:
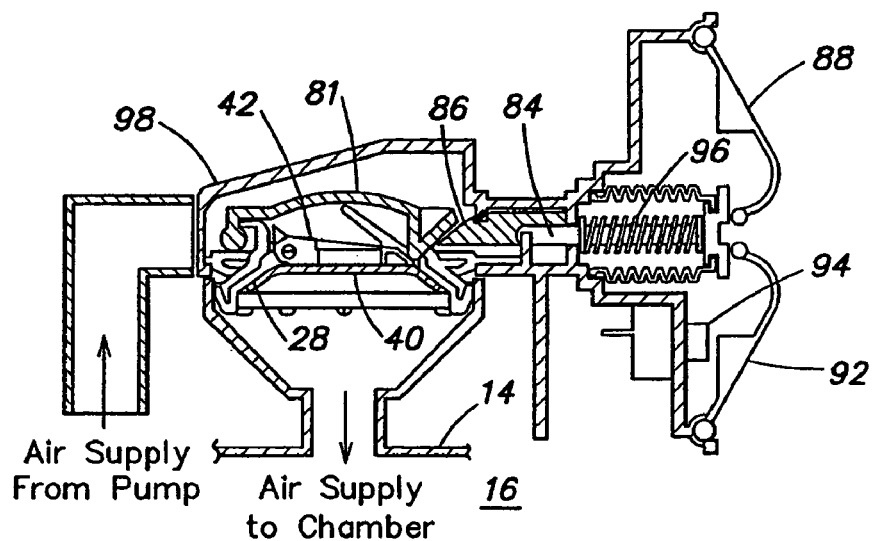
FIGS. 4A-4C illustrate another embodiment of an assembly of an actuator in combination with a self-sealing valve of the invention.
Figure 4B:
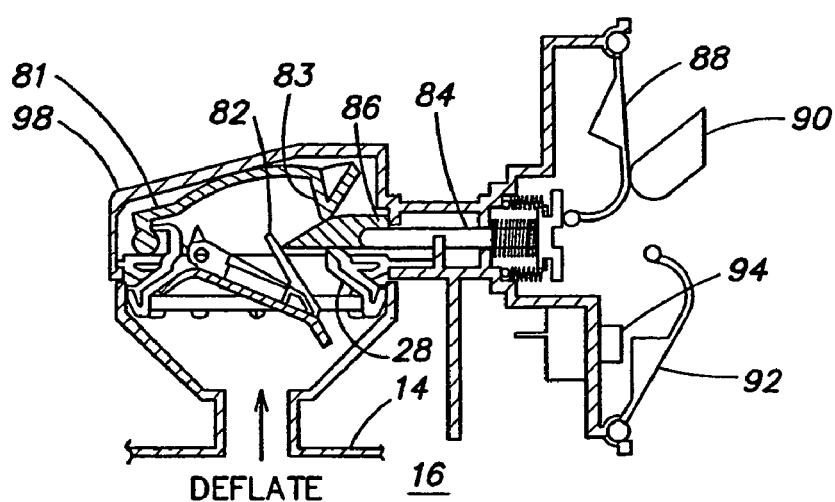
Figure 4C:
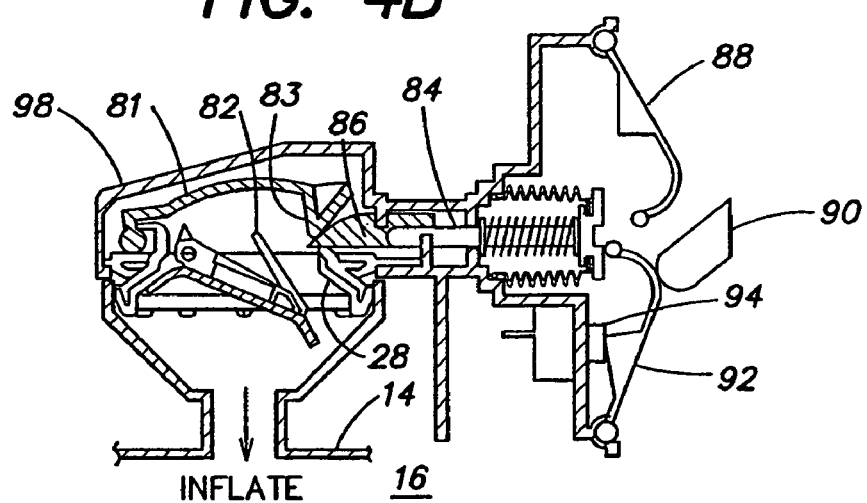

FIGS. 4A-4C illustrate another embodiment of an assembly of an electromechanical device in combination with a self-sealing valve of the invention. This embodiment comprises a self-sealing valve assembly 80, such as, as has been described infra. The self-sealing valve assembly comprises a flexible diaphragm 40 and a diaphragm support 42 that positions the diaphragm within an opening through which fluid can be supplied to or exhausted from an inside 16 of fluid impermeable bladder 14. The self-sealing valve assembly also includes a projecting arm 82 from the diaphragm support 42, that is configured to interact with a portion 86 of an actuator arm 84. The assembly also comprises a cover 81 having a surface 83 that also interacts with the portion 86 of the actuator arm 84. The actuator arm 84 and portion 86 are configured to bias the cover 81 upward so as to open the cover, and are also configured to bias the projecting arm 80 so as to push the diaphragm support 42 and diaphragm 40 at least partially away from valve seat 28, as illustrated in FIG. 4B, when a deflate lever 88 is depressed, for example, by a finger 90 of a user. The assembly also comprises an inflate lever 92, which can also be depressed by the finger 90 of the user so as to urge the actuator arm into contact with the surface 83 of the cover 81 so as to open the cover, as illustrated in FIG. 4C. The inflate lever is also configured, when depressed, to contact and bias a power switch 94 to energize a fluid moving device to supply fluid from the fluid moving device to the self-sealing valve 80, as is also illustrated in FIG. 4C.

In the illustrated embodiment of FIGS. 4A-4C, the actuator arm also comprises spring assembly 96, which maintains the actuator arm 84 in an at rest position, which is disengaged from the cover 81 and the self-sealing valve 80. By depressing the deflate lever 88, the actuator arm is urged into contact with the surface 83 of the cover 81 and the projecting arm 82 of the self-sealing valve assembly, so as to bias open the cover and to bias open the self-sealing valve 80 for the purpose of deflating the inflatable device, as illustrated in FIG. 4B. By depressing the inflate level 92, the actuator arm 84 is urged into contact with the surface 83 of the cover 81 so as to bias open the cover to inflate the inflatable device as illustrated in FIG. 4C. As illustrated in FIG. 4C, the inflate lever both turns on the fluid moving device to provide fluid to the inflatable device and also biases open the cover for the purpose of providing fluid to the inflatable device.

In this embodiment, the self-sealing valve is configured to open under sufficient fluid pressure from the fluid moving device, when the cover is biased open by depressing the inflate lever, in the absence of any biasing open of the self-sealing valve from the actuator arm 84. The self-sealing valve is also configured to close in the absence of such fluid pressure from the fluid moving device and in the absence of any bias from the actuator device, with sufficient fluid pressure within the fluid impermeable bladder 16, to a closed position. The self-sealing valve is further configured to at least partially open to allow fluid to escape through the self-sealing valve from the inflatable device to regulate an amount of fluid within the inflatable device, when the cover and the self-sealing valve is biased open by the actuator arm, by depressing the inflate lever.

It should be appreciated that although FIGS. 4A-4C illustrate an embodiment of a actuator device and valve assembly comprising a single self-sealing valve, there may be provided a plurality of such self-sealing valves, for example along a row within a common housing 96, all coupled to the fluid moving device, and all provided with a respective deflate lever 88, inflate lever 92, and spring assembly 96 comprising actuator arm 84, so as to be able to respectively bias open and close each self-sealing valve assembly for the purpose of inflating and deflating a plurality of fluid impermeable bladders within an inflatable device. In other words, the assembly of FIGS. 4A-4C can be used to fill, deflate and control a fluid level within an inflatable device that comprises a plurality of fluid impermeable bladders, each having a respectively assembly as illustrated in FIGS. 4A-4C, so as to be able to control the fluid pressure within each fluid impermeable bladder independently, and with the added advantage of only having to use a single fluid moving device. It is to be appreciated that the fluid moving device may be located remotely from the self-sealing valve and the electromechanical assembly.

Having thus described several aspects of at least one embodiment of this invention, it is to be appreciated various alterations, modifications, and improvements will readily occur to those skilled in the art. For example, it is to be appreciated that for any of the above described embodiments, the fluid moving device can be provided remotely from, for example, the self-sealing valves, and also that the controls to bias on and off the fluid moving device and any of the electromechanical devices can be located remotely from the fluid moving device and the electromechanical devices. In addition, it is to be appreciated that there may be some embodiments or applications where the electromechanical device may also be used to open the self-sealing valve of any of the embodiments described infra for the purpose of aiding the inflating of the inflatable device such as, for example, where the self-sealing valve is not opened appreciably by the fluid moving device upon inflation. Such alterations, modifications, and improvements are intended to be part of this disclosure, and are intended to be within the spirit and scope of the invention. Accordingly, the foregoing description and drawings are by way of example only.

What is claimed is:

1. A valve and electromechanical device assembly configured for use with an inflatable device that includes an inflatable bladder, the assembly comprising:
a self-sealing valve fluidly coupled to the inflatable bladder, the self sealing valve comprising a valve housing having a wall defining an opening through which a fluid is provided, wherein the self sealing valve further comprises a valve seat and a diaphragm assembly that positions a diaphragm adjacent to the valve seat, the diaphragm assembly configured to move at least a portion of the diaphragm at least partially away from the valve seat under bias of a fluid provided on a first side of the diaphragm assembly, and that is configured to close the diaphragm assembly and maintain a seal with the diaphragm against the valve seat under bias of a fluid on a second side of the diaphragm assembly;
an electromechanical device comprising an actuator arm, the actuator arm having a first position in which the actuator arm acts on the diaphragm assembly to urge the at least the portion of the diaphragm at least partially away from the valve seat so as to open the self-sealing valve, and having a second position in which the actuator arm does not act upon the self sealing valve; and
a fluid moving device positioned so as to provide the fluid to the first side of the diaphragm assembly,
wherein the self sealing valve, the electromechanical device and the fluid moving device are each located, at least in part, within a profile of the inflatable bladder.

2. The assembly as claimed in claim 1, wherein the electromechanical device is positioned so as to act on the first side of the diaphragm assembly.

3. The assembly as claimed in claim 1, wherein a portion of the diaphragm assembly is coupled to a portion of the valve housing with a hinged mount assembly.

4. The assembly of claim 3, wherein the actuator arm contacts the diaphragm assembly at a portion of the diaphragm assembly opposite the hinged mount assembly.

5. The assembly of claim 1, wherein the opening is defined by the valve housing comprising a constant diameter portion and the valve housing further comprising an increased diameter portion with a tapered wall between the constant diameter portion and the increased diameter portion so as to provide the valve seat.

6. The assembly of claim 1, wherein the electromechanical device is configured to bias the actuator arm to contact the diaphragm, when in the first position, so as to bias open the self-sealing valve.

7. The assembly of claim 1, wherein the electromechanical device comprises a solenoid.

8. The assembly of claim 1, further comprising a second self-sealing valve assembly, comprising:
a second self-sealing valve comprising a second opening through which a fluid is provided.

9. The assembly as claimed in claim 8, further comprising a second electromechanical device comprising a second actuator arm, the second actuator arm having a first position in which the second actuator arm urges the second self-sealing valve so as to open the second self-sealing valve, and having a second position in which the second actuator arm does not act upon the self-sealing valve.

10. The assembly as claimed in claim 9, further comprising a rotating arm, responsive to a third actuator device, that rotates between a first position that seals any fluid from a fluid moving device from the first side of a diaphragm assembly of the self-sealing valve, so as to seal the self-sealing valve from the fluid moving device, and that in a second position seals a first side of the second self-sealing valve from the fluid moving device, so that only one of the self-sealing valve assembly and the second self-sealing valve assembly can be coupled to the fluid moving device at any one time.

11. The assembly as claimed in claim 10, wherein each of the first electromechanical device and the second electromechanical device comprise a solenoid.

12. The assembly as claimed in claim 11, wherein the third actuator device also comprises a solenoid.

13. The assembly as claimed in claim 10, wherein each of the first electromechanical device and the second electromechanical device comprise a motor.

14. The assembly as claimed in claim 9, wherein each of the first electromechanical device and the second electromechanical device comprise a solenoid.

15. The assembly as claimed in claim 9, wherein each of the first electromechanical device and the second electromechanical device comprise a motor.

16. The assembly of claim 1, in a combination with a fluid impermeable bladder coupled to the assembly.

17. The assembly as claimed in claim 16, wherein an inflation level in the fluid impermeable bladder is adjusted when the actuator arm is in the first position.

18. The assembly as claimed in claim 16, wherein the electromechanical device and actuator arm are configured such that in the first position, the actuator arm urges the at least the portion of the diaphragm at least partially away from the valve seat against the bias of the fluid on the second side of the diaphragm assembly to substantially deflate the fluid impermeable bladder by exhausting the fluid from the bladder via the self sealing valve.

19. The assembly as claimed in claim 1, wherein the diaphragm is a flexible diaphragm.

20. The assembly as claimed in claim 1, wherein, when in the first position, the actuator arm acts on the diaphragm assembly to urge at least the portion of the diaphragm at least partially away from the valve seat.

21. The assembly as claimed in claim 1, wherein the actuator arm is attached to the electromechanical device and the actuator arm is included in a fluid path of the fluid.

22. The assembly as claimed in claim 1, wherein the self sealing valve is configured to maintain a seal when the bias of the fluid is .2 psi to 10 psi on the second side of the diaphragm assembly.

23. The assembly of claim 1, wherein the diaphragm comprises a flexible diaphragm.

24. The assembly of claim 23, wherein a periphery of the flexible diaphragm flexes to open the self-sealing valve when the self-sealing valve receives fluid discharged from the fluid moving device.

25. The assembly of claim 1, wherein the assembly is configured for use with an inflatable mattress.

26. The assembly of claim 1, wherein the electromechanical device comprises a motor.

27. The assembly of claim 1, further comprising a cover that covers the self-sealing valve, the cover having a projecting arm projecting from the cover and having a surface that is configured to interact with the actuating arm of the electromechanical device.

28. A method of regulating an amount of fluid within an inflatable device comprising an inflatable bladder, a fluid moving device, a self-sealing valve and an electromechanical device, comprising:
fluidly coupling the fluid moving device to the inflatable bladder via the self-sealing valve;

locating each of the self sealing valve, the electromechanical device and the fluid moving device, at least in part, within a profile of the inflatable bladder;

biasing open the self-sealing valve with sufficient fluid pressure provided from the fluid moving device, so as to provide the fluid to the inflatable bladder;

biasing the self-sealing valve to a closed position with sufficient pressure from fluid within the inflatable bladder and in the absence of fluid from the fluid moving device; and biasing with the electromechanical device, the self-sealing valve to at least a partially opened position so as to regulate an amount of fluid within the inflatable bladder.

29. The method of claim 28, wherein the act of biasing the self-sealing valve to the at least partially open position comprises contacting with an actuator arm of the electromechanical device, a diaphragm assembly of the self-sealing valve.

30. The method as claimed in claim 29, wherein the act of biasing the self-sealing valve to the at least partially open position comprises contacting with the actuator arm of the electromechanical device, a portion of the diaphragm assembly opposite a hinge point of the diaphragm assembly.

31. The method of claim 28, wherein the act of biasing the self-sealing valve at least partially open with the electromechanical device comprises biasing the self-sealing valve at least partially open with a solenoid.

32. The method of claim 28, wherein the act of biasing the self-sealing valve at least partially open with the electromechanical device comprises allowing fluid to flow at least partially out of the inflatable bladder through the self-sealing valve.

33. The method of claim 28, wherein the act of biasing open the self-sealing valve so as to provide the fluid to the inflatable bladder comprises not biasing open the self-sealing valve with the electromechanical device.

34. The method of claim 28, wherein the act of biasing open the self-sealing valve to provide the fluid to the inflatable bladder comprises biasing open the self-sealing valve with the electromechanical device.

35. The method of claim 28, wherein the act of biasing open the self-sealing valve so as to provide the fluid to the inflatable bladder comprises biasing on the fluid moving device to provide the fluid.

36. The method of claim 28, further comprising:

biasing open a second self-sealing valve with sufficient fluid pressure provided from the fluid moving device, so as to provide the fluid through a second opening of the second self-sealing valve to the inflatable bladder;

biasing the second self-sealing valve to a closed position under sufficient pressure from fluid within the inflatable bladder and in the absence of fluid from the fluid moving device; and biasing the second self-sealing valve to at least a partially opened position so as to regulate an amount of fluid within the inflatable bladder.

37. The method of claim 36, further comprising rotating an arm between a first position that seals any fluid from the fluid moving device from the first side of the diaphragm assembly of the self-sealing valve, and a second position that seals the first side of the second diaphragm assembly of the second self-sealing valve from the fluid moving device, so that only one of the self-sealing valve assembly and the second self-sealing valve assembly can be coupled to the fluid moving device at any one time.

38. The method as claimed in claim 28, further comprising an act of substantially deflating the inflatable bladder by exhausting the fluid from the inflatable bladder via the self sealing valve when the self-sealing valve is biased to the at least partially opened position.

39. The method as claimed in claim 28, further comprising an act of biasing the self-sealing valve to the closed position with a maximum of 10 psi pressure from the fluid within the inflatable bladder.

40. The method of claim 28, wherein the act of biasing with the electromechanical device, the self-sealing valve to at least a partially opened position comprises biasing the self-sealing valve to the at least partially opened position with a motor.

41. The method of claim 28, wherein the act of biasing open the self-sealing valve so as to provide the fluid to the inflatable bladder comprises biasing open a cover that covers the self-sealing valve.

42. The method of claim 28, wherein the act of biasing with the electromechanical device, the self sealing valve to at least a partially opened position comprises biasing open a cover that covers the self-sealing valve.

* * * * *